United States Patent
Bernhardt et al.

(10) Patent No.: US 10,060,737 B2
(45) Date of Patent: Aug. 28, 2018

(54) METHOD AND MACHINE FOR DETERMINING A SHAPE CONTOUR ON A MEASUREMENT OBJECT

(71) Applicant: Carl Zeiss Industrielle Messtechnik GmbH, Oberkochen (DE)

(72) Inventors: Ralf Bernhardt, Aalen (DE); Rainer Sagemueller, Faechsenfeld (DE); Dominik Seitz, Schwaebisch Gmuend (DE)

(73) Assignee: CARL ZEISS INDUSTRIELLE MESSTECHNIK GMBH, Oberkochen (DE)

( * ) Notice: Subject to any disclaimer, the term of this patent is extended or adjusted under 35 U.S.C. 154(b) by 533 days.

(21) Appl. No.: 14/872,289

(22) Filed: Oct. 1, 2015

(65) Prior Publication Data

US 2016/0040987 A1 Feb. 11, 2016

Related U.S. Application Data

(63) Continuation of application No. PCT/EP2013/056953, filed on Apr. 2, 2013.

(51) Int. Cl.
  *G01B 21/04* (2006.01)
  *G01B 5/008* (2006.01)
(52) U.S. Cl.
  CPC ............ *G01B 21/04* (2013.01); *G01B 5/008* (2013.01)
(58) Field of Classification Search
  CPC ........ G01B 21/04; G01B 5/008; G01B 7/008; G01B 13/03
  USPC ........................................................ 33/503
  See application file for complete search history.

(56) References Cited

U.S. PATENT DOCUMENTS

| 5,347,723 A | 9/1994 | Russell |
| 8,590,875 B2 | 11/2013 | Stumpp |

(Continued)

FOREIGN PATENT DOCUMENTS

| CN | 201059953 Y | 5/2008 |
| DE | 195 22 276 C1 | 10/1996 |

(Continued)

OTHER PUBLICATIONS

Examination Report for Patent Appl'n No. 2016-505710, dated Jan. 10, 2017; 4 pp.

(Continued)

*Primary Examiner* — Christopher Fulton
(74) *Attorney, Agent, or Firm* — Harness, Dickey & Pierce, P.L.C.

(57) ABSTRACT

A coordinate measuring machine has a rotary table supporting a measurement object, a measuring head including a measuring element and a frame, on which the measuring head is arranged. The frame has first, second and third frame parts moveable relative to the workpiece holder along first, second and third movement axes, respectively. The measuring element is mounted via at least one fluid bearing, such as an air bearing, on one or more of the frame parts. The measuring head is positioned at a defined position along the first, second and third movement axes. Thereafter, the at least one fluid bearing is deactivated and the rotary table rotated around a further axis while the measuring head, using the measuring element, records current measured values. A shape contour of the object is determined on the basis of the measured values recorded while the at least one fluid bearing was selectively deactivated.

16 Claims, 3 Drawing Sheets

(56) References Cited

U.S. PATENT DOCUMENTS

| | | | |
|---|---|---|---|
| 8,984,876 B2 | 3/2015 | Fukuda et al. | |
| 9,671,210 B2* | 6/2017 | Sagemueller | G01B 21/042 |
| 2004/0163268 A1 | 8/2004 | McMurtry et al. | |
| 2009/0172962 A1 | 7/2009 | Aubele et al. | |
| 2009/0271997 A1* | 11/2009 | Ruck | G01B 5/008 |
| | | | 33/503 |
| 2012/0079731 A1* | 4/2012 | Ruck | G01B 5/012 |
| | | | 33/503 |
| 2014/0317942 A1* | 10/2014 | Sagemueller | G01B 21/042 |
| | | | 33/503 |
| 2016/0195389 A1* | 7/2016 | Sagemueller | G01B 21/045 |
| | | | 33/503 |

FOREIGN PATENT DOCUMENTS

| | | |
|---|---|---|
| DE | 196 23 601 A1 | 1/1997 |
| DE | 10 2008 058 198 A1 | 5/2010 |
| DE | 10 2010 006 297 A1 | 7/2011 |
| DE | 10 2011 112 734 A1 | 7/2012 |
| EP | 0 402 440 B1 | 6/1995 |
| EP | 0 701 663 B1 | 3/1996 |
| EP | 1 862 761 A1 | 12/2007 |
| JP | 03-084408 | 4/1991 |
| JP | 08-114442 | 5/1996 |
| JP | 2005-300318 | 10/2005 |
| JP | 2009-536325 | 10/2009 |
| JP | 2011-027616 | 2/2011 |
| WO | 2013/110337 A1 | 8/2013 |

OTHER PUBLICATIONS

ISA/EP; International Search Report dated Feb. 19, 2014; 3 pp.
English language translation of International Preliminary Report on Patentability (Chapter 1) for PCT/EP2013/056953; dated Oct. 6, 2015; 18 pp.

* cited by examiner

METHOD AND MACHINE FOR DETERMINING A SHAPE CONTOUR ON A MEASUREMENT OBJECT

CROSS-REFERENCES TO RELATED APPLICATIONS

This application is a continuation of international patent application PCT/EP2013/056953 filed on Apr. 2, 2013 designating the U.S., which international patent application has been published in German language. The entire content of this priority application is incorporated herein by reference.

BACKGROUND OF THE INVENTION

The present invention relates to methods and a machine for determining a shape contour on a measurement object. More particularly, the invention relates to a new approach for determining a shape contour on a measurement object by using a coordinate measuring machine.

Coordinate measuring machines are flexible measuring devices which are primarily used in industrial production measurement technology. They usually have a measuring head which can be moved relative to a workpiece holder within a measurement volume. The measurement volume is spanned by the movement axes along which the measuring head can move relative to the workpiece holder. For the measurement, the measuring head is brought into a defined position relative to various selected measuring points. Spatial coordinates for each selected measuring point can then be determined from the position of the measuring head within the measurement volume and from the position of the measuring head relative to the selected measuring points. The spatial coordinates define the location of the measuring point within the measurement volume. If the spatial coordinates are determined for a multiplicity of measuring points, geometric dimensions on the object to be measured can be determined by using the spatial coordinates.

Originally, coordinate measuring machines were primarily used for individual point measurements. For this purpose, the measuring head has a stylus with a free end, which is brought into contact with the selected measuring point. Simple measuring heads are only able to produce a switching signal, which signals the contact with the selected measuring point. So-called scanning or gauging measuring heads are furthermore able to determine a deflection of the stylus relative to the measuring head during sensing. With gauging measuring heads it is possible to travel along the contour of a workpiece in a so-called scanning mode, in order in this way to determine a multiplicity of measured values and consequently a multiplicity of spatial coordinates for a multiplicity of measuring points along the contour.

Moreover, there are nowadays various non-contacting measuring heads for coordinate measuring machines. To be mentioned by way of example are measuring heads with capacitive sensors or measuring heads which, by means of laser triangulation, laser interferometry or with the aid of focal measuring methods, optically determine a distance between the measuring head and selected measuring points on the object to be measured.

For highly precise shape measurements, such as the roundness measurement on rotational bodies, until now specific shape measuring devices have generally been used. These are substantially less flexible than classic coordinate measuring machines. They are optimized to the desired shape measurement on specific objects to be measured, at the cost of flexibility.

For instance, DE 195 22 276 C1 discloses a shape measuring device for measuring external taper threads. The object to be measured, having an external taper thread, is clamped on a carriage between two points such that it can rotate. The carriage is then aligned in such a way that the axis of the external thread and the measurement axis of a feeler that can be moved in precisely one coordinate direction are located orthogonally relative to each other. With the aid of measuring wires, which are laid in mutually opposite thread gaps and are sensed by the feeler, it is possible to record measured values from which the flank diameter and the taper angle of the object to be measured are determined. Following the alignment of the object to be measured, the carriage can be locked.

DE 10 2008 058 198 A1 describes a flexible coordinate measuring machine of portal design. The measuring head is arranged at the lower end of a quill, which can be moved in the vertical direction. The quill is arranged on a carriage, which can be moved in a first horizontal direction. The carriage is arranged on a portal, which can be moved in a second horizontal direction. The portal is mounted on a base, on which there is arranged a workpiece holder in the form of a rotary table. The rotary table makes it possible to rotate a measurement object relative to the measuring head. In principle, a shape measurement is therefore possible. For instance, a rotationally symmetrical object to be measured can be rotated by the rotary table while the measuring head scans the outer circumference of the object to be measured. The measuring accuracy of such a shape measurement is limited, however, as compared with specific shape or roundness measuring devices, although DE 10 2008 058 198 A1 suggests, inter alia, determining the inclination of the rotary table relative to the base as a result of an eccentric loading and correcting the resultant wobble error. Despite this correction, there is the desire to further increase the measuring accuracy of such a coordinate measuring machine with rotary table during shape measurements.

CN 201059953 Y discloses a manually operated coordinate measuring machine of portal design, in which the operator has a keypad in the area of the measuring head, with which he is able to selectively activate or deactivate the air supply into the air bearings of the individual axes. It is therefore possible to block individual movement axes of the coordinate measuring machine.

Furthermore, it is known from EP 0 701 663 B1 or DE 10 2011 112 734 A1 to deactivate air bearings of a coordinate measuring machine when the coordinate measuring machine stops for a certain time, in order in this way to save power. DE 10 2010 006 297 A1 proposes, in such a case, to keep the position controller operating even when the air bearings are deactivated, in order to minimize initialization steps when resuming operation.

From DE 196 23 601 A1 or EP 1 862 761 B1, it is known to block the stylus of a tactile measuring head in one or two coordinate directions, in order to permit a deflection of the stylus only in the coordinate direction or directions that remain.

From EP 0 402 440 B1, it is known to scan the surface of a measurement object continuously with a stylus while the measuring head is stationary. In this case, the measuring head has a two-axis rotary swivel joint, with the aid of which the stylus can be rotated relative to the measuring head about two orthogonal axes.

SUMMARY OF THE INVENTION

Against this background, it is an object of the present invention to provide a method and a coordinate measuring machine which permit a higher measuring accuracy during shape measurement on objects—in particular rotationally symmetrical ones. It is another object to enable higher measuring accuracy in shape measurements in a cost efficient manner.

According to a first aspect of the invention, there is provided a method for determining a shape contour on a measurement object, comprising the steps: providing a coordinate measuring machine having a rotary table, a measuring head with a measuring element and a frame, on which the measuring head is arranged, wherein the frame has a first frame part moveable relative to the rotary table along a first movement axis, a second frame part moveable relative to the rotary table along a second movement axis, and a third frame part moveable relative to the rotary table along a third movement axis, and wherein the rotary table can be rotated about a further axis; arranging the measurement object on the rotary table and positioning the measuring element at a defined position along the first, second and third movement axes by moving at least one of the first, second and third frame parts; rotating the rotary table while the measuring head, using the measuring element, records current measured values which represent spatial positions of measuring points on the measurement object relative to the measuring head; and determining the shape contour on the basis of the current measured values; wherein the measuring element is mounted via at least one fluid bearing in order to permit a movement of the measuring element relative to the rotary table; and wherein the at least one fluid bearing is deactivated while the current measured values are recorded.

According to a further aspect, there is provided a coordinate measuring machine for determining dimensional characteristics including a shape contour on a measurement object, comprising a workpiece holder having a rotary table, comprising a measuring head having a measuring element, comprising a frame on which the measuring head is arranged, and comprising an evaluation and control unit, wherein the frame has a first frame part which can be moved relative to the workpiece holder along a first movement axis, and wherein the frame has a second frame part which can be moved relative to the workpiece holder along a second movement axis, wherein the rotary table can be rotated about a further axis, wherein the evaluation and control unit is configured to position the measuring head at a defined position along the first and second movement axes and to rotate the rotary table while the measuring head, using the measuring element, records current measured values which represent spatial positions of measuring points on the measurement object relative to the measuring head, wherein the evaluation and control unit is further configured to determine the shape contour on the basis of the current measured values, wherein the measuring element is mounted via at least one fluid bearing in order to permit a movement of the measuring element relative to the workpiece holder, and wherein the evaluation and control unit is further configured to deactivate the at least one fluid bearing during recording of the current measured values.

According to a yet another aspect, there is provided a method for determining a shape contour on a measurement object, comprising the steps of providing a coordinate measuring machine having a rotary table, a measuring head and a frame supporting the measuring head, the frame having a first frame part moveable relative to the rotary table along a first movement axis, a second frame part moveable relative to the rotary table along a second movement axis, and a number of air bearings enabling movement of said first and second frame parts relative to the rotary table, arranging the measurement object on the rotary table, positioning the measurement head relative to the rotary table along said first and second movement axes, rotating the rotary table about a further axis and simultaneously recording current measured values using the measurement head, said current measured values representing spatial positions of measuring points on the measurement object, and determining the shape contour on the basis of the current measured values, wherein at least one air bearing from the number of air bearings is deactivated while the current measured values are recorded.

The novel methods and machine are based on the finding that fluid bearings, which are advantageous from many points of view and with which the frame parts and/or the measuring heads of modern coordinate measuring machines are equipped, promote vibrations of the measuring element during a contour measurement using the rotary table. The vibrations lead to a significant increase in the noise component in the measured signal and therefore to a limited accuracy, since an unknown statistical error is respectively superimposed on the individual measured values. The temporary deactivation of the fluid bearings during the recording of the measured values contributes to reducing the vibrations noticeably during the recording of the measured values. The stiffness of the frame and of the measuring element can be increased in a simple manner during the shape measurement. As a result, the novel method and the corresponding coordinate measuring machine permit a higher measuring accuracy when scanning a shape contour on a measurement object which is rotated relative to the measuring head using the rotary table.

Furthermore, as compared with classic shape measuring devices, the novel method and machine have the advantage that, in addition to the shape of a contour, various dimensions on the object to be measured and, moreover, also the location of the object to be measured within the measurement volume can be measured in one and the same clamping position, i.e. without re-clamping the object to be measured. This contributes to a further increase in the measuring accuracy during measurements on complex objects to be measured, since each re-clamping of the object to be measured impairs the measuring accuracy as a result of associated tolerances. The flexibility of the known coordinate measuring machine, which in particular results from the ability of the measuring head to travel along three movement axes, preferably respectively arranged orthogonally relative to one another, is fully maintained. However, added to this are a high stiffness and therefore a higher measuring accuracy during shape measurements with the rotary table.

Preferably, the new coordinate measuring machine and method have a measurement volume which is greater along each of the three aforementioned movement axes than the diameter of the rotary table. This means that the measuring head is able to travel along each of the three aforementioned movement axes at least by a distance Lx, Ly, and Lz which is greater than the diameter of the rotary table. The measuring head can therefore move to the object to be measured from virtually any desired direction and, on account of the very large measurement volume as compared with classic shape measuring devices, is able to measure various types of workpieces.

Furthermore, it is preferable if the at least one fluid bearing is automatically re-activated by the evaluation and control unit following the recording of the measured values, in particular in order to record further measured values on the same object to be measured. Accordingly, the at least one fluid bearing is therefore deactivated for relatively short time intervals within a longer-lasting measuring sequence.

As compared with previously known methods and devices, the novel method and the corresponding coordinate measuring machine therefore enable more flexible and more accurate measurement of complex workpieces.

The deactivation of fluid bearings, in particular air bearings, on a coordinate measuring machine has already been disclosed as such by the prior art, as the documents indicated at the beginning show. As distinct from the prior art, however, the novel methods and machine deactivate one or more fluid bearings during the actual measurement operation. Added to this is the fact that the evaluation and control unit of the novel coordinate measuring machine is capable of positioning the measuring head within the measurement volume via motor drives. The novel methods and the coordinate measuring machine therefore permit a measurement to be carried out in an automatic operation, wherein, within the automated measuring sequence, at least one fluid bearing is deactivated after the measuring head has been positioned at the defined measuring position. The deactivation of the at least one fluid bearing has the consequence that the corresponding frame part is stopped during the measuring sequence. At the same time, the evaluation and control unit must take care that the electric drives do not move the measuring element in this state, since this would otherwise lead to damage. The novel method and the corresponding coordinate measuring machine therefore require profound modification of the automated measuring sequences of known coordinate measuring machines.

This applies to a particular extent to a coordinate measuring machine of the type mentioned at the beginning which has a workpiece holder in the form of a rotary table, since the rotary table axis can be inclined in various directions, depending on the individual loading. Accordingly, during the rotation of the rotary table, the measuring head is located relative to the shape contour in a position that is individual and varies depending on the loading of the rotary table. In the coordinate measuring machine mentioned at the beginning, consideration was given to readjusting the position of the measuring head along the three movement axes during the recording of the measured values, in order to react to the individual rotary table inclination if necessary. This is not readily possible in the novel method and the corresponding coordinate measuring machine, since a movement of the measuring head along that movement axis of which the air bearing has been deactivated is no longer possible.

However, more detailed studies have shown that the advantages of the novel method and of the corresponding coordinate measuring machine compensate for the aforementioned disadvantages to an unexpected extent. Accordingly, the object mentioned above has been completely achieved.

In a preferred refinement of the invention, the first and the second movement axes span a plane which is perpendicular to the further axis, wherein the first frame part is mounted via at least one first fluid bearing, wherein the second frame part is mounted via at least one second fluid bearing, and wherein the at least one first and the at least one second fluid bearing are deactivated during the recording of the measured values.

In this refinement, two movement axes of the coordinate measuring machine are temporarily clamped during the recording of the measured values. The clamped movement axes span a plane which is located substantially orthogonally to the axis of rotation of the rotary table. Here, any inclination of the rotary table axis as a result of mounting tolerances and/or as a result of eccentric loading of the rotary table with a measurement object is disregarded. The refinement permits maximum stiffness of the frame in a plane perpendicular to the rotary table axis. Here, this is usually a horizontal plane. The refinement permits a particularly high increase in the measuring accuracy.

In an alternative refinement, the first and the second movement axes span a plane which is perpendicular to the further axis, wherein the first frame part is mounted via at least one fluid bearing, wherein the second frame part is mounted via at least one second fluid bearing, and wherein the at least one first fluid bearing is deactivated during the recording of the measured values, while the at least one second fluid bearing remains activated during the recording of the measured values.

In this refinement, the measuring head is clamped in only one direction of the plane mentioned above, while it can continue to be moved in the other axial direction. In a preferred exemplary embodiment, in which the coordinate measuring machine is implemented in a portal design, that movement axis along which the portal can be moved relative to the workpiece holder is advantageously blocked. This movement axis is often designated the Y axis. On the other hand, the carriage on the cross-member of the portal remains movable in this exemplary embodiment, since the fluid bearings of the carriage remain activated. The refinement has the advantage that the evaluation and control unit is able to control out an eccentricity error, i.e. off-center clamping of the object to be measured on the rotary table, in a relatively straightforward way, by moving the measuring head closer to the object to be measured or further away from the object to be measured, by means of the drives for the second movement axis. The refinement makes it possible to keep the measuring head in an optimal measuring range. Accordingly, this refinement contributes to a high measuring accuracy in different way from the previously mentioned alternative. The refinement is particularly advantageous for the measurement of objects to be measured which do not exhibit complete rotational symmetry, such as cylindrical half-shells.

In a further refinement, which is advantageous both on its own and in combination with the preceding refinements, the third movement axis extends substantially parallel to the further axis, wherein the third frame part is mounted via at least one third fluid bearing, and wherein the at least one third fluid bearing is deactivated during the recording of the measured values.

In this refinement, the measuring head is clamped along a movement axis which extends substantially parallel to the axis of rotation of the rotary table. In case of a coordinate measuring machine of portal or bridge design, this is typically the movement axis along which the quill is moved vertically by the measuring head. In coordinate measuring machines of portal or bridge design, the quill is generally the frame part which is most susceptible to vibration, since, as compared with the portal and the portal carriage, the quill has relatively long, freely suspended regions. The clamping of this movement axis therefore contributes in a particular way to reducing measuring errors as a result of machine vibrations.

In a further refinement, the third movement axis extends parallel to the further axis, wherein the third frame part is mounted via at least one third fluid bearing, and wherein the at least one third fluid bearing remains activated during the recording of the measured values.

In this refinement, the measuring head specifically remains movable along the third movement axis, while at least one other movement axis is clamped. This refinement is particularly advantageous when the two other movement axes are clamped as a result of deactivation of the respective fluid bearings. The refinement makes it possible to move the measuring head along the third movement axis during the measurement. This can advantageously be used, for example, in order to scan the outer circumference of a rotationally symmetrical cylinder or the cylindrical inner wall of a bore, in the manner of a helix. In other words, in this refinement the measuring head can be moved parallel to the axis of rotation in order to scan the shape curve in different vertical positions.

Furthermore, by using this refinement, it is possible to control out or eliminate a so-called Z-addition during the recording of the measured values. A Z-addition in this sense is the change in the vertical position of the shape contour to be measured which is established as a result of an inclination of the rotary table. In preferred exemplary embodiments, before the actual recording of the measured values, the inclination of the rotary table axis is determined in a first measuring cycle which, as such, is described by way of example in DE 10 2008 058 198 A1, mentioned at the beginning. Consequently, this document is incorporated here by reference, in particular with regard to the explanations relating to determining the inclination of the rotary table axis. The actual measured values for the shape contour are then recorded in a second measuring cycle, wherein the evaluation and control unit moves the measuring head along the third movement axis on the basis of the previously determined inclination of the rotary table axis—preferably alternately. The refinement permits a high measuring accuracy in particular on objects to be measured which exhibit a very asymmetrical weight distribution and/or significant inclinations of the rotary table axis as a result of mounting tolerances.

In a further refinement, the coordinate measuring machine has a first position controller, which controls a position of the measuring head relative to the workpiece holder along the first movement axis. Furthermore, the coordinate measuring machine has a second position controller, which controls a position of the measuring head relative to the workpiece holder along the second movement axis. Finally, the coordinate measuring machine has a third position controller, which controls a position of the measuring head relative to the workpiece holder along the third movement axis. The respective position controller for the first, second and third movement axis is deactivated during the recording of the current measured values when an air bearing belonging to the same movement axis is deactivated.

In this refinement, the movement of the measuring head is not only clamped by one or more fluid bearings being deactivated. In addition, one or more position controllers is/are also temporarily deactivated. The refinement also contributes to avoiding vibrations of the frame during the recording of the measured values, or at least largely to reducing the same. As long as the position controllers are active, they repeatedly check the current position of the measuring head along the respectively associated movement axis in a closed control loop. If a deviation between intended and actual position is determined, the position controllers activate the electric drives of the associated movement axis in order to compensate for the position difference. Even if the measuring head is generally fixed as a result of deactivation of one or more fluid bearings in the corresponding movement axis, vibrations in the frame can be generated by repeated activation of the electric drives. This disadvantageous effect is minimized by the present refinement.

In a further refinement, the rotary table is mounted via at least one further fluid bearing, wherein the further fluid bearing remains activated during the recording of the current measured values.

In this refinement, it is not just the measuring head that is mounted via at least one fluid bearing such that it can move. Instead, the rotary table is also mounted via the at least one further fluid bearing. The further fluid bearing remains active during the measurement, in order to permit the most uniform and friction-free rotation of the rotary table. Accordingly, this refinement includes the air supply for the coordinate measuring machine or the supply of another fluidic medium in the case of other fluid bearings also being maintained during the temporary deactivation of individual fluid bearings. The refinement thus permits faster re-starting of an only temporarily deactivated fluid bearing.

In a further refinement, the measuring head has a stylus for touching the object to be measured and at least one measuring force generator, which is configured to exert a defined desired measuring force on the stylus.

In this refinement, the measuring head is a so-called active measuring head. The measuring force generator is capable of exerting a force on the stylus in at least one defined direction of movement. If the stylus is suspended freely in space without touching a measurement object, the result of the measuring force is that the stylus is deflected relative to the measuring head base. However, if the stylus is resting on a measurement object, it cannot escape from the measuring force of the measuring force generator. It transfers the measuring force to the object to be measured.

Active measuring heads in this sense are known. In conjunction with the novel method and the corresponding coordinate measuring machine, an active measuring head has the advantage that the measuring force generator can advantageously be used to compensate for different distances of the surface of the object to be measured from the stationary measuring head up to a certain amount. Accordingly, the evaluation and control unit of the novel coordinate measuring machine activates the measuring force generator in preferred exemplary embodiments such that the tip of the stylus follows the variations of the shape contour during the recording of the measured values and thus is kept continuously in contact with the surface of the object to be measured. The stylus is thus deflected using the measuring force generated such that it maintains the contact with the workpiece surface, even if the workpiece surface has a depression. In one exemplary embodiment, the evaluation and control unit activates the measuring force generator in parallel with the axis of the rotary table on the basis of a previously determined inclination of the rotary table axis, in order in this way to control out a vertical Z-addition without moving the measuring head itself with the aid of the drives of the coordinate measuring machine. The refinement makes it possible for the tip of the stylus to be measured with a high measurement accuracy in a straightforward way even in the event of deviations of the object to be measured from a desired intended position.

In a further refinement, the measuring head has a working range which defines a minimum desired measuring force and a maximum desired measuring force, wherein the measured values are recorded with a defined desired measuring force which amounts to at least 30% of the maximum desired measuring force, preferably at least 50% of the maximum desired measuring force.

In this refinement, during the recording of the measured values, the measuring force generator of an active measuring head is activated by a control signal which generates a relatively high measuring force in the case of an intended position of the object to be measured. Equally, the defined position of a passive measuring head is selected such that the stylus exerts a relatively high measuring force on the object to be measured. The refinement has the advantage that the stylus maintains the contact with the surface of the object to be measured with high probability. So-called "air scans", which can occur in particular in the case of eccentric loading of the rotary table and/or in the event of crooked clamping of the workpiece, are minimized.

In a further refinement, before the deactivation of the at least one fluid bearing, first measured values which represent a position of the object to be measured relative to the movement axes are recorded, wherein the measuring head is positioned at the defined position on the basis of the first measured values.

In this refinement, the recording of the actual measured values for determining the shape contour is carried out in two steps. Firstly, in a first measuring cycle, first measured values are recorded on the object to be measured by the measuring head being brought into a defined measuring position relative to the object to be measured. In the process, preferably all the fluid bearings of the coordinate measuring machine are active. The current position of the object to be measured within the measurement volume can be determined from the first measured values. In some exemplary embodiments, a plurality of individual scans of the object to be measured at defined measuring points may be sufficient to determine the current location of the object to be measured in the measurement volume. For example, the evaluation and control unit can scan the object to be measured at three measuring points. In other exemplary embodiments, the rotary table is already rotated to record the first measured values and, with the aid of the measuring head, the evaluation and control unit records a multiplicity of measured values which already represent the shape contour on the object to be measured. In a second measuring cycle, the evaluation and control unit uses the measured results from the first measuring cycle in order to determine the position of the measuring head relative to the object to be measured optimally. Accordingly, with the aid of the drives of the coordinate measuring machine, the evaluation and control unit moves the measuring head firstly to the measuring position which has been determined on the basis of the first measured values. The evaluation and control unit then deactivates the at least one fluid bearing in order to determine the spatial contour with a higher measuring accuracy in accordance with the novel method and the novel coordinate measuring machine. The refinement has the advantage that the evaluation and control unit is always able to move the measuring head to an optimal measuring position, in order in particular to operate the sensors of a gauging measuring head in a linear central measuring range. The measuring accuracy of the novel method and of the corresponding coordinate measuring machine is increased further.

In a further refinement, calibration data which represents a position change of the measuring head as a result of the deactivation of the at least one air bearing is provided.

An active fluid bearing lifts the supported frame part by a certain distance, by a cushion of air or liquid being produced between the frame part and the mating surface. When the fluid bearing is deactivated, the corresponding frame part sinks onto the mating surface of the fluid bearing. Therefore, the position of the measuring head in the measurement volume of the coordinate measuring machine changes when the at least one fluid bearing is deactivated. In this preferred refinement, the coordinate measuring machine has calibration data which represents such a position change of the measuring head. The evaluation and control unit is advantageously configured to determine the current measured values by using the calibration data. The refinement has the advantage that the current measured values represent the shape contour more accurately, in particular in relation to further shape features on the same object to be measured. The refinement is therefore particularly advantageous if the determination of the shape contour on the object to be measured is only one of several measuring processes and, furthermore, for example, also specific dimensions on the object to be measured are determined.

Furthermore, the calibration data can advantageously be used to correct a so-called settling error. If, for example, a frustoconical object to be measured is to be measured with the novel method, the deactivation of the at least one fluid bearing can lead to the evaluation and control unit "catching" a slightly larger or slightly smaller diameter on the object to be measured. On account of the deactivation of the at least one fluid bearing, the evaluation and control unit measures the object to be measured in a different sectional plane than without deactivation. This sectional plane offset can be corrected advantageously with the aid of the calibration data.

In a further refinement, at least one mechanical clamping element is provided, with which the at least one measuring element is additionally further clamped mechanically following the deactivation of the at least one fluid bearing.

In this refinement, the novel coordinate measuring machine has at least one mechanical clamping element which is configured so as to fix the measuring element further additionally mechanically directly and/or via a frame part. The refinement permits particularly high stiffness and, as a result, particularly high measuring accuracy for the shape measurement on a measurement object which is arranged on the rotary table.

It goes without saying that the features cited above and those still to be explained below can be used not only in the respectively specified combination but also in other combinations or on their own without departing from the scope of the present invention.

BRIEF DESCRIPTION OF THE DRAWINGS

Exemplary embodiments of the invention are illustrated in the drawing and will be explained in more detail in the following description.

DESCRIPTION OF PREFERRED EMBODIMENTS

Figure 1:
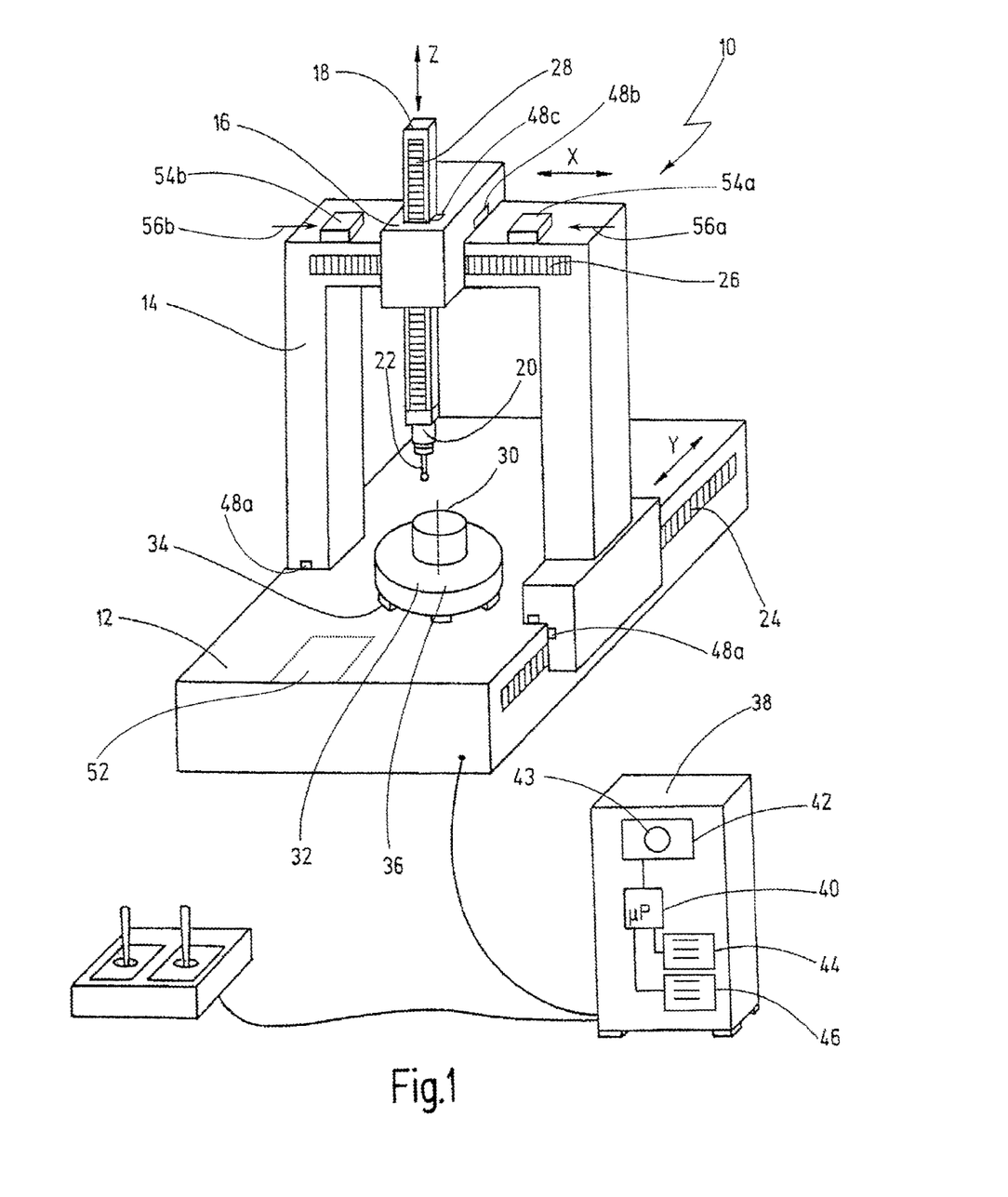
FIG. 1 shows an exemplary embodiment of the novel coordinate measuring machine.

In FIG. 1, an exemplary embodiment of the novel coordinate measuring machine is designated by reference number 10 in its entirety. The coordinate measuring machine 10 has a base 12, on which a portal 14 is arranged here. The portal 14 carries a carriage 16. Arranged on the carriage 16 is a quill 18. At the lower free end of the quill 18 there is arranged a measuring head 20, which here carries a stylus 22. In other exemplary embodiments, the measuring head 20 can be a non-contacting measuring head, for example a measuring head which determines the distance to a measuring point on a measurement object capacitively or optically.

Reference numbers 24, 26, 28 each designate a scale, with the aid of which the position of the portal 14 relative to the base 12, the position of the carriage 16 relative to the portal 14, and the position of the quill 18 relative to the carriage 16 can be determined. The scales 24, 26, 28 are read in a known way by means of suitable sensors (not shown here). For instance, these are glass scales, which are each read with an optical sensor.

Reference number 30 designates a measurement object, which is arranged on a rotary table 32. Here, the rotary table 32 is mounted on the base 12 via air bearings 34. Via an electric drive (not shown here), the rotary table 32 can be rotated about an axis 36. With the aid of the rotary table 32, the object 30 to be measured can therefore be rotated relative to the measuring head 20 and the stylus 22.

Reference number 38 designates an evaluation and control unit which, in this case, controls all the drives of the coordinate measuring machine 10. Furthermore, the evaluation and control unit 38 receives the measured values from all the sensors of the coordinate measuring machine 10, and, on the basis of the measured values, it determines spatial coordinates and/or a shape contour on the object 30 to be measured. Reference number 40 designates a processor of the evaluation and control unit 38. Reference number 42 designates a display on which here, by way of example, a circular shape contour 43 is illustrated, representing the outer circumference of the object 30 to be measured, which is cylindrical here.

Reference number 44 designates a first memory, in which an evaluation and control program is stored. The control program includes algorithms with which, for example, the measured values supplied by the scales 24, 26, 28 are processed in order to determine the spatial coordinates of selected measuring points on the object 30 to be measured.

A further memory 46 in this exemplary embodiment contains calibration data, which is used by the evaluation and control unit 38 to process the measured values and to determine the shape contour of the object 30 to be measured. In the preferred exemplary embodiments, the calibration data represents, amongst other things, a position change of the measuring head 20 which results from the deactivation of the air bearings, described below, according to the novel method.

Here, by way of example, the reference numbers 48a, 48b, 48c indicate air bearings, via which the portal 14, the carriage 16 and the quill 18 are mounted such that they can move relative to the base 12 and therefore also relative to the rotary table 32. Alternatively, the coordinate measuring machine 10 could have fluid bearings which, instead of air, use another medium, for example a water-oil mixture. The coordinate measuring machine 10 has a number of electric drives 50a, 50b, 50c (see FIG. 3), with the aid of which the evaluation and control unit 38 is able to move the measuring head 20 within a measurement volume, which is spanned by the maximum travels of the portal 14, of the carriage 16 and of the quill 18. With the aid of a first drive 50a, the evaluation and control unit 38 can move the portal 14 in the direction of the arrow Y relative to the base 12. Typically, this movement axis in coordinate measuring machines of portal design is designated as the Y axis.

Via a further drive 50b, the evaluation and control unit 38 can move the carriage 16 in the direction of an arrow X. Accordingly, the movement axis of the carriage 16 is normally designated as the X axis. The evaluation and control unit 38 can move the quill 18 in the direction of a third movement axis Z, which is consequently named the Z axis. The X and Y axes together span a plane 52 which, in coordinate measuring machines of portal design, is usually a horizontal measuring plane. Here, the axis of rotation 36 of the rotary table 32 is perpendicular to the plane 52 and parallel to the movement axis Z of the quill 18.

Here, by way of example, reference numbers 54a, 54b designate two slides, which are arranged on the cross member of the portal 14 on opposite sides of the carriage 16. The evaluation and control unit 38 in this exemplary embodiment is able to displace the slide 54a in the direction of the arrow 56a. In the same way, the evaluation and control unit 38 is able to displace the slide 54b in the direction of the arrow 56b. The slides 54a, 54b together form a mechanical clamping element, with which, in preferred exemplary embodiments of the novel method, the carriage 16 can be clamped mechanically in order to obtain a particularly stiff frame structure for the performance of a shape measurement on the object 30 to be measured.

Figures 2A, 2B:
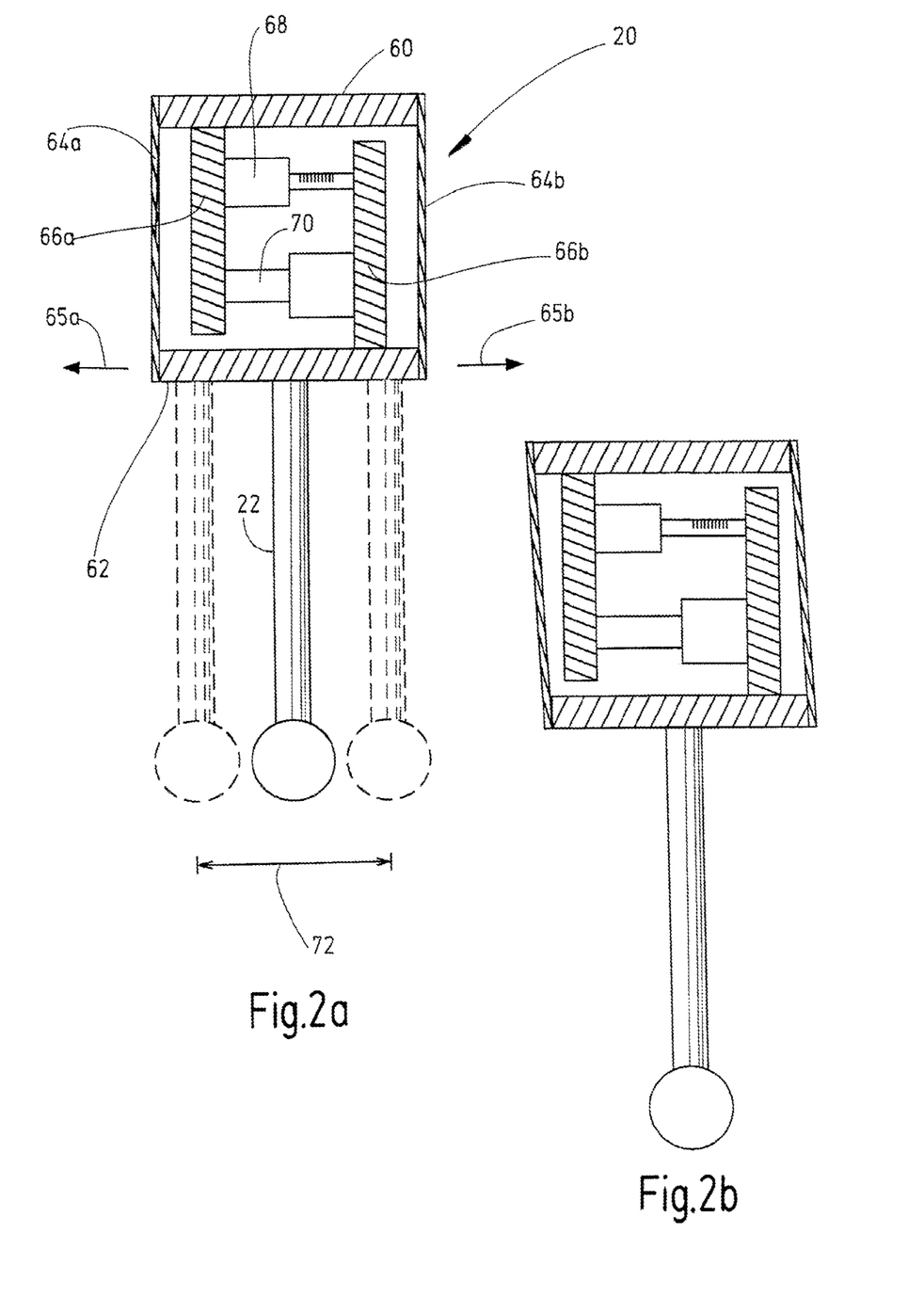
FIGS. 2a and 2b show a simplified illustration of the measuring head used in the coordinate measuring machine from FIG. 1.

In FIGS. 2a and 2b, the measuring head 20 of the coordinate measuring machine 10 is shown in a highly simplified illustration. The measuring head 20 has a measuring head base 60 and a part 62 which is connected to the measuring head base 60 by two leaf springs 64a, 64b. As a result of the leaf springs 64a, 64b, the part 62 can be moved relative to the measuring head base 60 in the direction of the arrows 65a, 65b, as illustrated in FIG. 2b.

The measuring head base 60 is connected to a first carrier element 66a. The part 62 is connected to a second carrier element 66b. The carrier elements 66a, 66b are opposite each other. Arranged between the carrier elements 66a, 66b is a sensor 68, with the aid of which the displacement of the part 62 relative to the measuring head base 60 in the direction of the arrows 65a, 65b can be measured. In the exemplary embodiment illustrated, the sensor 68 is a plunger coil. Alternatively, the sensor 68 could be a piezoelectric, capacitive, optical and/or magnetic sensor.

The reference number 70 designates a measuring force generator which is able to force the carrier elements 66a, 66b away from each other in the direction of the arrows 65a, 65b or to draw them together in the opposite direction. With the aid of the measuring force generator 70, the evaluation and control unit 38 can create a measuring force with the stylus 22. As illustrated at reference number 72, the measuring force generator 70 has a working range which defines a minimum desired measuring force and a maximum desired measuring force. As long as the stylus 22 is not resting on a measurement object, the measuring force manifests itself in a corresponding deflection of the stylus 22 relative to the measuring head base 60.

In the illustration of FIGS. 2a, 2b, the stylus 22 can be deflected in only one direction relative to the measuring head base 60. In the preferred exemplary embodiments, however, the measuring head 20 has three spring parallelograms and measuring force generators 70, with the aid of which the evaluation and control unit 38 can optionally deflect the stylus 22 along the movement axes X, Y and Z or apply a measuring force to said stylus. In the preferred exemplary embodiments of the novel method, the evaluation and control unit 38 utilizes this property in order to bring the stylus 22 into contact with the object 30 to be measured during the recording of the measured values. The three measuring force generators 70 for the movement axes X, Y, Z, which correspond to the three movement axes of the coordinate measuring machine 10, are once more indicated in FIG. 3 at the reference numbers 70a, 70b, 70c.

Figure 3:
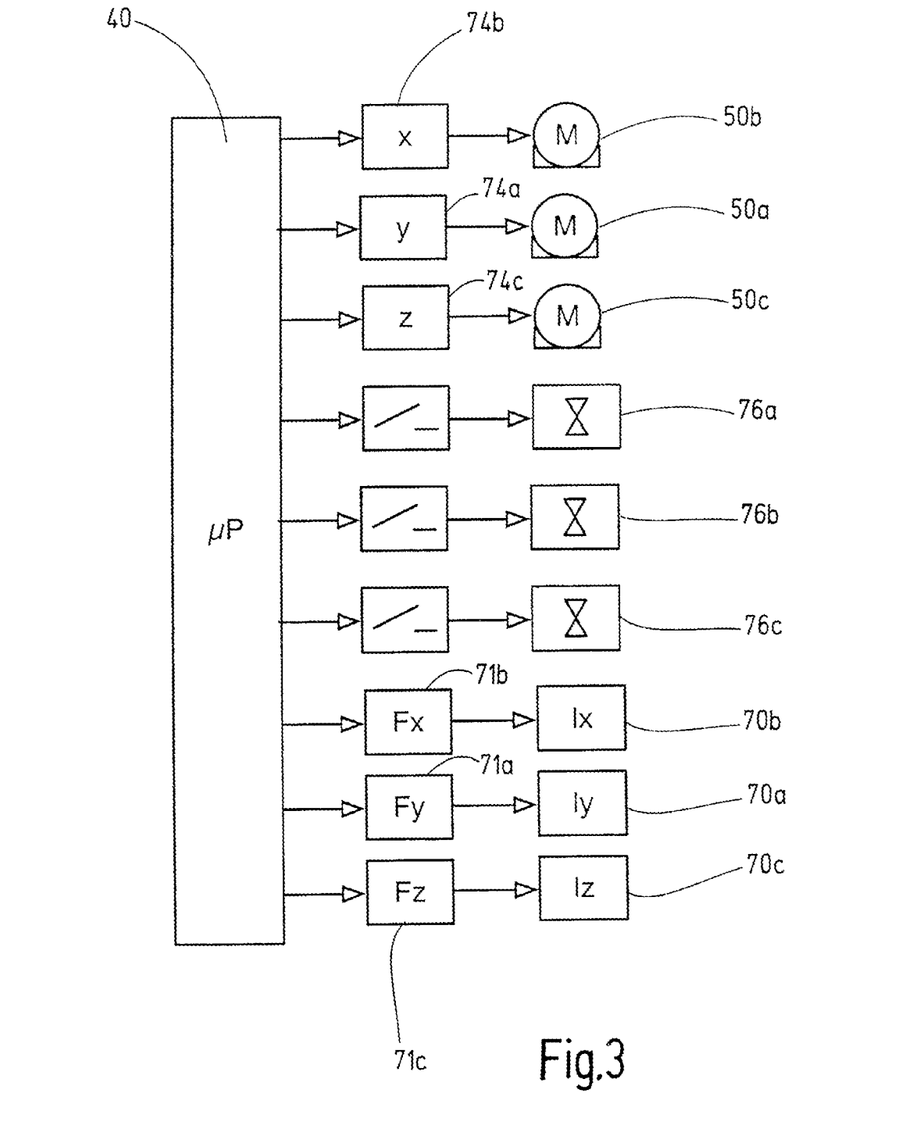
FIG. 3 shows a simplified illustration of functional sub-assemblies which, in the coordinate measuring machine from FIG. 1, are activated in accordance with the novel method.

FIG. 2 shows a simplified illustration of a so-called active measuring head, in which the measuring force can be controlled with the aid of the measuring force generator 70 for each direction of movement. A corresponding controller for each measuring force direction is indicated in FIG. 3 at the reference numbers 71a, 71b, 71c. In other exemplary embodiments, on the other hand, the measuring head is a passive measuring head, in which the measuring force is set solely via a spring having a known spring constant and the position of the measuring head 20 relative to the workpiece 30.

FIG. 3 shows the microprocessor 40 of the evaluation and control unit 38 as well as further functional subassemblies of the coordinate measuring machine 10. The reference number 74a designates a position controller, via which the microprocessor 40 activates the electric drive for the Y axis of the coordinate measuring machine 10. Comparable position controllers 74a, 74c are provided for the X and the Z movement axis. The position controllers 74 form a closed control loop, which each evaluates a current actual position of the portal 14, of the carriage 16 and of the quill 18, respectively, and, on the basis thereof, activates the respective electric drives 50a, 50b and 50c in order to move the movable frame parts to an intended position defined by the microprocessor 40 on the basis of the control program in the memory 44.

Reference numbers 76a, 76b, 76c designate valves, via which the evaluation and control unit 38 can activate or deactivate the air bearings 48a, 48b, 48c on the portal 14, the carriage 16 and the quill 18. According to the novel method, the measuring head 20 is firstly moved into a defined measuring position relative to the object 30 to be measured. The evaluation and control unit 38 then deactivates the air bearings 48 of one or more movement axes in order to fix the measuring head 20 at the defined measuring position with an increased stiffness. In the exemplary embodiment illustrated, the evaluation and control unit 38 moves the measuring head 20 to a defined measuring position at which the stylus 22 touches the shape contour that is to be measured on the object 30 to be measured. The evaluation and control unit 38 then activates the rotary table 32 in order to rotate the object 30 to be measured relative to the stylus 22. With the aid of the sensors 68 in the measuring head, the deflections of the stylus 22 as a result of the rotation of the object 30 to be measured are measured. By using these measured values and—in the preferred exemplary embodiments—by using the calibration data in the memory 46, the evaluation and control unit 38 then determines the shape contour.

In a preferred exemplary embodiment of the novel method, in a first step the inclination of the axis 36 of the rotary table 32 is determined with the aid of a reference object, for example by using a test cylinder having known properties or by using a ring gauge. Then, the object 30 to be measured and having the shape contour to be measured is clamped as centrally as possible on the rotary table 32. In some exemplary embodiments, the rotary table 32 has a three-jaw chuck (not shown here), with which the object 30 to be measured can be fixed.

After that, the object 30 to be measured is scanned at selected measuring points by the evaluation and control unit 38 moving the measuring head 20 so far toward the object 30 to be measured that the stylus 22 touches the selected measuring point with a defined desired measuring force. From the location of the scanned measuring points, the location of the workpiece 30 within the measurement volume can be determined. Alternatively or additionally, the evaluation and control unit 38 can rotate the rotary table 32 in order to scan the shape contour to be measured in a first measuring cycle.

Using the first measured values obtained, in preferred exemplary embodiments a check is made as to whether the workpiece axis and the rotary table axis 36 are at least approximately the same. If the workplace axis deviates by more than a defined limiting value from the rotary table axis 36, the evaluation and control unit 38 in the preferred exemplary embodiments generates a warning message which informs the operator of the coordinate measuring machine 10 that the workpiece clamping must be corrected. In some exemplary embodiments, the evaluation and control unit 38 can correct the clamping of the workplace 30 automatically with the aid of suitable motor drives on the rotary table (not shown here).

The predefined limiting value in the preferred exemplary embodiments is given by the working range 72 in which the stylus 22 can be deflected with the aid of the measuring force generators 70. In preferred exemplary embodiments, the predefined limiting value is smaller than the maximum possible working range 72, in order that the sensor 68 of the measuring head 20 is kept in a largely linear central working range.

In the next step, the evaluation and control unit 38 determines an optimal measuring position for the measuring head 20 within the measurement volume, taking the calibration data 46 into account. The evaluation and control unit 38 moves the measuring head 20 at the optimal measuring position so far toward the object 30 to be measured that the stylus 22 touches the surface of the object to be measured in the area of the shape contour to be measured.

According to the novel method, the evaluation and control unit 38 then switches off the air bearings for one or more movement axes of the coordinate measuring machine 10. In some exemplary embodiments, the air bearings for the X and Y axes are deactivated, while the air bearings for the Z axis remain active in order to compensate for the Z offset of the measuring head 20 when the air bearings for the X and Y axes are deactivated.

In other exemplary embodiments, the evaluation and control unit 38 deactivates the air bearings for all three movement axes of the coordinate measuring machine 10. Here, the compensation for the Z offset is preferably carried out with the aid of the measuring force generator for the Z axis in the measuring head 20. Alternatively, if the evaluation and control unit 38 determines the optimal measuring position for the measuring head 20, the offset can already be taken into account by the evaluation and control unit 38 with the aid of the calibration data 46.

After that, highly accurate scanning of the shape contour at the surface of the object 30 to be measured is carried out, by the evaluation and control unit 38 rotating the rotary table 32 about the axis 36. In the preferred exemplary embodiments, with the aid of the measuring force generators for the X and Y axes, a defined measuring force is generated constantly over the entire deflection range of the stylus 22, in order to avoid air scans.

The evaluation and control unit then determines the shape contour of the object 30 to be measured on the basis of the recorded measured values.

In some exemplary embodiments, the evaluation and control unit 38 deactivates the air bearings 48a for the portal 14, while the air bearings 48b for the carriage 16 remain active. As a result, it is possible that the evaluation and control unit can move the measuring head 20 in the X direction during the recording of the measured values, in order to follow the shape contour of the object 30 to be measured over the working range 72 of the appropriate measuring force generator 70. This is particularly advantageous when the object 30 to be measured is clamped eccentrically onto the rotary table 32.

In some exemplary embodiments, the evaluation and control unit 38 determines the eccentricity error by using empirical values, which are stored in the form of parameter data in the memory 46 of the evaluation and control unit 38. For instance, mechanical stops have a reproducibility which is typically less than 0.5 mm. The nominal diameter of the workpiece is known, on the basis of the CAD data and/or on the basis of the first measured values from the first measuring cycle. Therefore, the evaluation and control unit 38 is able to estimate the eccentricity error which results during repeated clamping of objects of the same type to be measured within the context of series testing.

The novel method and the novel coordinate measuring machine can also be used with a passive measuring head (without measuring force generators 70) instead of the active measuring head 20. In this case, the stylus 22 operates counter to a mechanical spring. The stylus 22 is moved by the evaluation and control unit 38 so far toward the object 30 to be measured that, at the nominal diameter of the object 30 to be measured, the stylus 22 experiences a predefined deflection, in order to generate the desired measuring force.

Furthermore, the novel method and the novel coordinate measuring machine can be used with non-contacting measuring heads 20. In these cases, too, the evaluation and control unit 38 determines a desired measuring position of the measuring head 20 in the measurement volume and then deactivates one or more air bearings of the coordinate measuring machine 10. In particular in the case of capacitive distance sensors, it is advantageous to carry out a calibration of the measuring head immediately before the recording of the measured values, in that, for example, before the recording of the actual measured values, the measuring head 20 is moved toward the object 30 to be measured and the measured values supplied by the measuring head 20 are compared with the measured values from the coordinate measuring machine 10 from the scales 24, 26, 28.

In measuring heads, the scanning of the object 30 to be measured is preferably carried out in such a way that the stylus 22 is pulled with the direction of rotation of the object 30 to be measured. The scanning is preferably carried out in a manner offset by about 45° in the direction of rotation, in order to avoid stick-slip effects.

Although the novel method has been explained here in a preferred exemplary embodiment of the novel coordinate measuring machine of portal design, the invention is not restricted thereto. The method can likewise be applied in coordinate measuring machines having other frame constructions, for example in coordinate measuring machines of bridge design or horizontal arm design. Furthermore, the method can also advantageously be applied in order to deactivate fluid bearings in the measuring head even during a shape measurement. Furthermore, the novel method can advantageously be used in order, for example, to carry out an evenness measurement and/or waviness measurement on a surface of a measurement object, such as for example the upper planar surface of the object 30 to be measured.

What is claimed is:

1. A method for determining a shape contour on a measurement object, comprising the steps:
providing a coordinate measuring machine having a rotary table, a measuring head with a measuring element and a frame on which the measuring head is arranged,
wherein the frame has a first frame part moveable relative to the rotary table along a first movement axis, a second frame part moveable relative to the rotary table along a second movement axis, and a third frame part moveable relative to the rotary table along a third movement axis, and wherein the rotary table can be rotated about a further axis,
arranging the measurement object on the rotary table and positioning the measuring element at a defined position along the first, second and third movement axes by moving at least one of the first, second and third frame parts,
rotating the rotary table while the measuring head, using the measuring element, records current measured values which represent spatial positions of measuring points on the measurement object relative to the measuring head, and
determining the shape contour on the basis of the current measured values,
wherein the measuring element is mounted via at least one fluid bearing in order to permit a movement of the measuring element relative to the rotary table, and
wherein the at least one fluid bearing is deactivated while the current measured values are recorded.

2. The method of claim 1, wherein the first and the second movement axes span a plane which is perpendicular to the further axis, wherein the first frame part is mounted via at least one first fluid bearing, wherein the second frame part is mounted via at least one second fluid bearing, and wherein both the at least one first and the at least one second fluid bearing are deactivated while the current measured values are recorded.

3. The method of claim 1, wherein the first and the second movement axes span a plane which is perpendicular to the further axis, wherein the first frame part is mounted via at least one first fluid bearing, wherein the second frame part is mounted via at least one second fluid bearing, and wherein the at least one first fluid bearing is deactivated during recording of the current measured values, while the at least one second fluid bearing remains activated during recording of the current measured values.

4. The method of claim 1, wherein the third movement axis extends parallel to the further axis, wherein the third frame part is mounted via at least one third fluid bearing, and wherein the at least one third fluid bearing is deactivated while the current measured values are recorded.

5. The method of claim 1, wherein the third movement axis extends parallel to the further axis, wherein the third frame part is mounted via at least one third fluid bearing, and wherein the at least one third fluid bearing remains activated while the current measured values are recorded.

6. The method of claim 1, wherein the coordinate measuring machine has a first position controller, which controls a position of the measuring head relative to the rotary table along the first movement axis, and wherein the first position controller is deactivated while the current measured values are recorded.

7. The method of claim 1, wherein the rotary table is mounted via at least one further fluid bearing, and wherein the at least one further fluid bearing remains activated while the current measured values are recorded.

8. The method of claim 1, wherein the measuring head has a stylus for touching the measurement object and has at least one measuring force generator, which is configured to create a defined desired measuring force on the measuring object by means of the stylus.

9. The method of claim 1, wherein the measuring head has a working range which defines a minimum desired measuring force and a maximum desired measuring force, wherein the measured values are recorded with a defined desired measuring force which amounts to at least 30% of the maximum desired measuring force.

10. The method of claim 1, wherein first measured values which represent a position of the measurement object along the first, second and third movement axes are recorded before the at least one fluid bearing is deactivated, and wherein the measuring head is positioned at the defined position on the basis of the first measured values.

11. The method of claim 1, wherein calibration data are provided, said calibration data representing a position change of the measuring head as a result of deactivation of the at least one fluid bearing, and wherein said calibration data are used in the step of determining the shape contour.

12. The method of claim 1, further comprising a step of mechanically clamping the measuring element after and in addition to the step of deactivating the at least one fluid bearing.

13. The method of claim 1, wherein the at least one fluid bearing is an air bearing.

14. A coordinate measuring machine for determining dimensional characteristics including a shape contour on a measurement object, comprising:
   a workpiece holder having a rotary table,
   a measuring head having a measuring element,
   a frame on which the measuring head is arranged, and
   an evaluation and control unit,
   wherein the frame has a first frame part which can be moved relative to the workpiece holder along a first movement axis, and
   wherein the frame has a second frame part which can be moved relative to the workpiece holder along a second movement axis,
   wherein the rotary table can be rotated about a further axis,
   wherein the evaluation and control unit is configured to position the measuring head at a defined position along the first and second movement axes and to rotate the rotary table while the measuring head, using the measuring element, records current measured values which represent spatial positions of measuring points on the measurement object relative to the measuring head,
   wherein the evaluation and control unit is further configured to determine the shape contour on the basis of the current measured values,
   wherein the measuring element is mounted via at least one fluid bearing in order to permit a movement of the measuring element relative to the workpiece holder, and
   wherein the evaluation and control unit is further configured to deactivate the at least one fluid bearing during recording of the current measured values.

15. The coordinate measuring machine of claim 14, wherein the at least one fluid bearing is an air bearing.

16. A method for determining a shape contour on a measurement object, comprising the steps of:
   providing a coordinate measuring machine having a rotary table, a measuring head and a frame supporting the measuring head, the frame having a first frame part moveable relative to the rotary table along a first movement axis, a second frame part moveable relative to the rotary table along a second movement axis, and a number of air bearings enabling movement of said first and second frame parts relative to the rotary table,
   arranging the measurement object on the rotary table,
   positioning the measurement head relative to the rotary table along said first and second movement axes,
   rotating the rotary table about a further axis and simultaneously recording current measured values using the measurement head, said current measured values representing spatial positions of measuring points on the measurement object, and
   determining the shape contour on the basis of the current measured values,
   wherein at least one air bearing from the number of air bearings is deactivated while the current measured values are recorded.

* * * * *